July 29, 1969 J. A. BARING 3,458,813
GALVANOMETER INCLUDING SUSPENSION MEANS FOR GENERATING AN
ELECTRICAL FEEDBACK
Filed Jan. 11, 1966 2 Sheets-Sheet 1
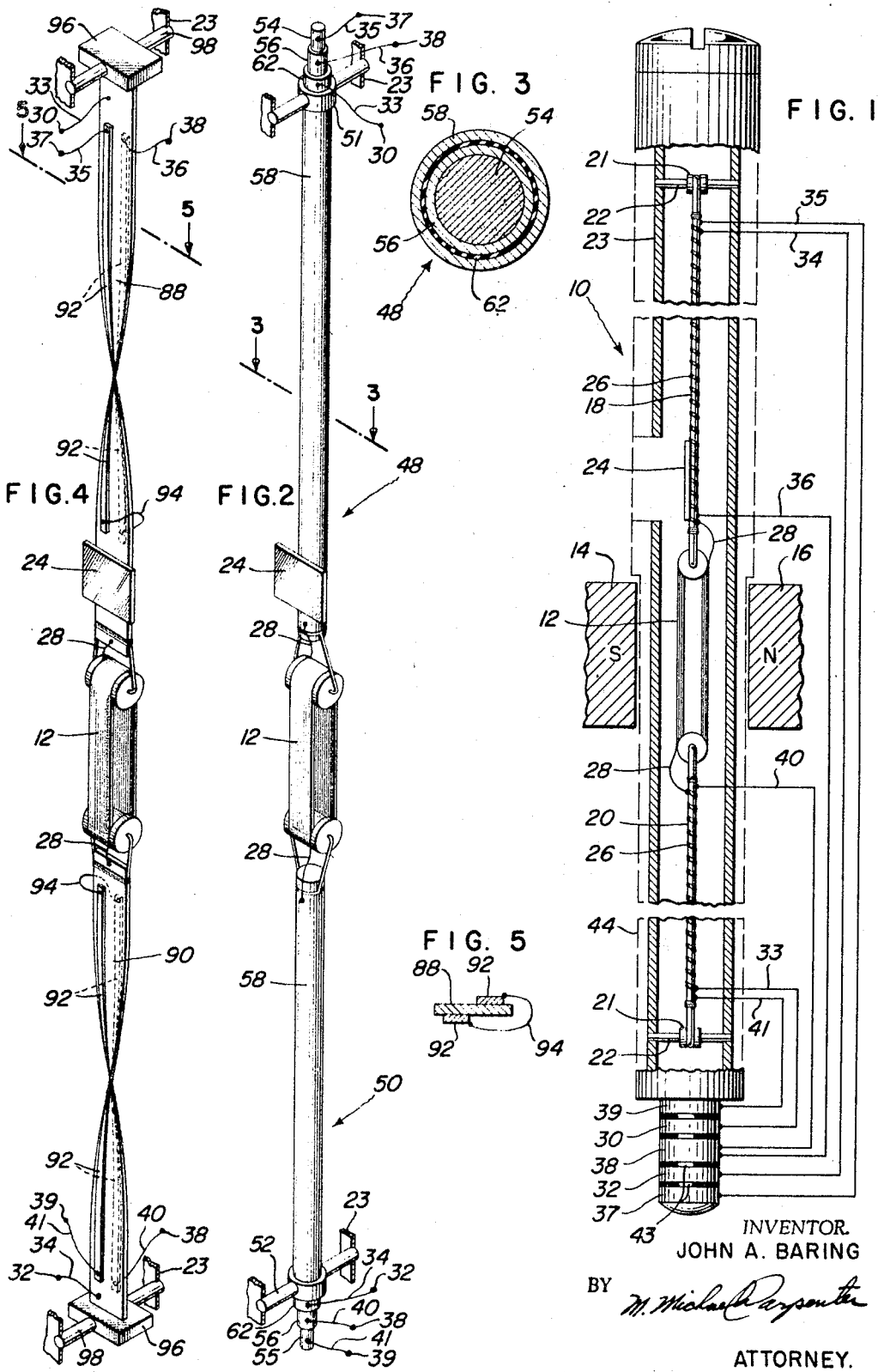
INVENTOR.
JOHN A. BARING
BY
ATTORNEY.

INVENTOR.
JOHN A. BARING
BY
ATTORNEY.

United States Patent Office 3,458,813
Patented July 29, 1969

3,458,813
GALVANOMETER INCLUDING SUSPENSION MEANS FOR GENERATING AN ELECTRICAL FEEDBACK
John A. Baring, Golden, Colo., assignor to Honeywell, Inc., Minneapolis, Minn., a corporation of Delaware
Filed Jan. 11, 1966, Ser. No. 520,014
Int. Cl. G01r 9/02, 13/38, 13/40
U.S. Cl. 324—154                8 Claims

ABSTRACT OF THE DISCLOSURE

A galvanometer having a coil supported within a magnetic field by suspension filaments is shown including at least one suspension filament constructed from a strain sensitive material which generates electrical characteristic variations as the coil is deflected. A deflection signal is applied to the coil by an electrical circuit, and the suspension filament is connected within the electrical circuit so that the generated electrical characteristic variations electrically damp the coil deflection by modifying the deflection signal applied thereto.

---

The invention relates to a means, associated with the vibratory assembly of a D'Arsonval type galvanometer, for producing an electrical feedback thereby improving the accuracy and useful frequency range of the galvanometer.

The construction of a D'Arsonval type galvanometer includes: a movable coil, a supporting frame, suspension filaments attached to opposite coil ends for connecting the coil to the frame, a magnetic field in which the coil is suspended, and a mirror or pointer connected to the vibratory assembly for indicating the deflection thereof. The galvanometer, thus described, forms the heart of an oscillographic recorder. A beam of radiant energy is reflected from the galvanometer mirror onto a photosensitive recording surface for providing a perament representation of an electrical signal being monitored by the oscillograph. In prior art galvanometers the suspension filament is also typically utilized as a current conducting lead for supplying the electrical signal to the coil. The angular deflection of the coil, within the magnetic field, is approximately proportional to the amplitude of the electrical current conducted therethrough. During static or low frequency deflections, the accuracy of the galvanometer is limited by several factors associated with its construction. These include: the flux density and its uniformity in the region of the coil, the torsional spring rate of the suspension, the geometrical errors associated with the angle between coil and the field, and the optical angle of the reflected beam relative to the normal of the recording surface. The dynamic response of a given galvanometer is limited by other factors as related particularly to the natural resonance of the vibratory assembly. The details of the vibratory assembly determine the frequenecy range over which the galvanometer will have a given accuracy. In order to increase the useful frequency range and accuracy of a glavanometer, the vibratory assembly is often damped by a fluid or an electromagnetic damping arrangement or both. These two alternatives are limited in their range and stability. Electromagnetic damping depends on the impedance of the external driving circuitry and thus is constrained to certain values. Fluid damping depends on the visocisty of the fill fluid and is thus subject to variations in fluid temperature, to compressibility effects of real fluids at high forces, and is further constrained to the quasi-linear effects characteristic of fluids. Thus, both the static and dynamic accuracy are limited by a number of constraints on the properties of materials.

Accordingly, an object of the instant invention is to improve the static and dynamic accuracies of a D'Arsonval type galvanometer by providing means for developing an electrical feedback therein.

A second object of this invention is to provide an electrical feedback for a D'Arsonval type galvanometer without additional structure attached thereto.

Another object of the prevent invention is to provide an electrical feedback means for damping the vibratory assembly of a galvanometer for improving the accuracy thereof.

Still another object of the present invention is to provide a means for producing an electrical feedback signal proportional to an electrical input signal received by an oscillographic galvanometer and capable of being electrically corrected to compensate for the non-linear errors inherent within the galvanometer.

A further object of the instant invention is to provide an electrical feedback means for supplying a degenerative feedback to an oscillographic galvanometer input signal and thereby improving the frequency response of the galvanometer over a wide frequency range.

A still further object of the present invention is to provide an oscillographic galvanometer with means for producing an electrical feedback signal which may be amplified for damping the displacement of a vibratory assembly of the galvanometer at its natural frequencies.

Other objects and advantages along with a better understanding of the present invention may be had from the following detailed description when read in connection with the accompanying drawings, in which:

FIG. 1 is a schematic representation of a vibratory assembly utilized within a galvanometer incorporating the present invention;

FIG. 2 is a side elevation of a vibratory assembly showing a variation of the present invention;

FIG. 3 is a sectional view taken along line 3—3 of FIG. 2;

FIG. 4 is a side elevation showing a second variation of the present invention;

FIG. 5 is a sectional view taken along line 5—5 of FIG. 4;

Figure 6:
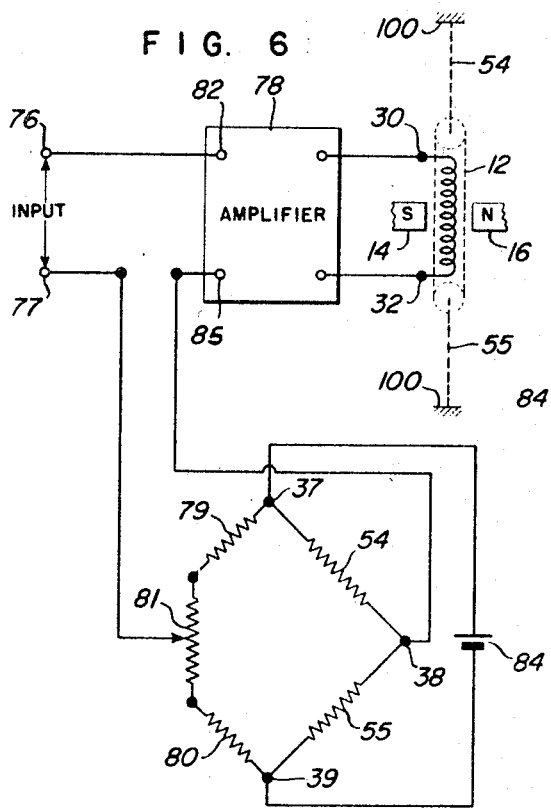
FIG. 6 is a wiring diagram of a galvanometer circuit embodying the present invention for modifying the response thereof with electrical feedback.

Referring to the drawings in more detail, a galvanometer vibratory assembly is shown generally at 10 in FIG. 1. A galvanometer coil 12 is disposed within a magnetic field produced by the poles of oppositely arranged permanent magnets 14 and 16. Suspension filaments 18 and 20 connect opposite ends of the galvanometer coil 12 to filament mounting collars 21 which are pinned by pins 22 to a frame member 23. The frame member 23 may be one of several suitable constructions for mounting the vibratory assembly, but in the preferred embodiment, a tubular housing is utilized with the vibratory assembly mounted within the longitudinal opening thereof. A mirror 24 is attached to the upper suspension filament 18, as by bonding, for providing an output in the form of a reflected light beam from a source of radiant energy, not shown. The mirror 24 may be replaced by a pointer and scale without departing from the scope of the present invention. The suspension filaments 18 and 20 are constructed from a piezoresistive semiconductor material which produces an electrical transformation, in the form of a resistance change when placed under a stress. In the present embodiment of this invention, bulk doped silicon is the material being utilized although other materials from the class of piezoresistive semiconductor materials, such as bulk doped germanium, may also be used.

A thin metallic coating 26, such as gold, is deposited on the surface of the bulk doped silicon thereby becoming an integral part of the strain sensitive suspension filament and forming a conductive component thereon.

The depositing of the conductive components 26 on the piezoresistive semiconductor material of suspension filaments 18 and 20 is preceded by the deposit of an insulating layer such as silicon dioxide, not shown. This procedure eliminates the bonding of components upon a suspension filament for substantially reducing inherent problems of hysteresis and creep normally associated with the strain gage bonding process. The conductive components 26 are connected to the coil 12 by jumper leads 28 and connected to coil output terminals 30, and 32, by jumper leads 33 and 34. The upper suspension filament 18 is provided with jumper leads, shown schematically at 35 and 36, for connecting the filament to output terminals 37 and 38. In a like manner, the lower suspension filament 20 is connected to terminals 38 and 39 by jumper leads 40 and 41. The suspension filaments 18 and 20 are connected as adjacent arms of a bridge circuit, to be described hereinbelow, and for this reason are shown schematically connected in common to terminal 38. The output terminals 30, 32, 37, 38, and 39 are separated by insulating disks 43 alternately arranged therebetween and attached to the lower portions of an outer housing 44, as by bonding. The outer housing 44 encloses the inner tubular housing 23 for completing the galvanometer assembly. The galvanometer described herein is especially suitable for use within an oscillographic recorder. When a galvanometer is utilized within an oscillograph, the overall accuracy of the galvanometer becomes a primary consideration, as theaccuracy of the whole instrument cannot exceed that of the galvanometer. Through the use of the present invention and the electrical feedback generated thereby the accuracy of an oscillograph can be improved from an instrument having a 4 percent error to one having an error of ¼ percent.

In the schematic representation of FIG. 1, the suspension filaments 18 and 20 are shown having their ends adjacent to the coil 12 connected by jumper leads directly to the output terminal 38. This arrangement is not desirable since a jumper lead connected from the central portions of the vibratory assembly to the frame member 23 would adversely affect the frequency response of the vibratory assembly. This may be prevented by providing a second thin metallic coating, not shown, deposited on the surface of each suspension filament for electrically connecting the end of the filament adjacent the coil 12 back to an area near the point of filament suspension. Other arrangements for providing electrical connections to each end of the piezoresistive suspension filaments are shown in FIGS. 2 and 4, to be described hereinbelow.

During assembly, the piezoresistive suspension filaments are positioned within the frame member 23 by rotating the upper portion of filament 18 in one direction while rotating the lower portion of filament 20 in the opposite direction. Each filament is then clamped by its associated suspension collar 21, whereby each suspension filament become prestressed in opposite directions. This arrangement provides a usable electrical signal whenever there is a zero deflection of the galvanometer coil. As the coil 12 deflects in one direction, one suspension element is placed under a decreasing torsional stress, for example filament 18 while the second filament 20 undergoes an increase in torsional stress. This results in a lowering of the resistance of the filament 18 and a raising of the resistance of the filament 20. When the coil 12 deflects in the opposite direction, the suspension filaments undergo a resistive change in a reversed manner, i.e. filament 18 increases in resistance and filament 20 decreases in resistance.

In operation, an electrical signal is applied across the terminals 30 and 32 thereby causing the coil 12 to deflect approximately in proportion to the amplitude of the signal current flowing therethrough. The deflection of the coil 12 creates a portional stress within the suspension filaments 18 and 20 for producing a transformation of the electrical characteristics thereof which, in the present embodiment, is a resistance change. The resistance change within piezoresistive suspension filaments 18 and 20 is directly proportional to the deflection of the coil 12. The suspension filaments 18 and 20 connect through terminals 37–38 and 38–39, respectively, into a bridge arrangement wherein the resistive change is utiled to provide a degenerative or negative feedback signal which is amplified for damping the deflective response of the galvanometer coil. The bridge arrangement will be described in greater detail hereinbelow.

FIG. 2 shows a modification of the vibratory assembly of the galvanometer shown in FIG. 1 wherein the coil 12 is supported by multicomponent suspension filaments 48 and 50 connected to mounting collars 51 which are pinned by pins 52 to the frame member 23. The galvanometer mirror 24 is attached to the upper suspension filament 48 by a suitable arrangement, as by bonding. As seen in FIG. 3, the suspension filaments 48 and 50 consist of a central piezoresistive component, 54 or 55 respectively, having a metallic coaxial component layer 56 deposited on the surface thereof. In the preferred embodiment the conductive component 56 consists of a gold deposit for providing a return lead from the ends of the piezoresistive components 54 and 55 adjacent the coil 12. A second conductive component, in the form of a second metallic layer 58, is coaxially deposited about the first conductive component 56 for providing a means to conduct electrical current to the coil 12. The second conductive component 58 is electrically connected to each end of the coil 12 by jumper leads 28. It may be desirable to provide a deposited insulating layer 62, such as silicon dioxide, between the inner coaxial conductive component 56 and the second outer coaxial conductive component 58. Obviously, such an insulating layer may also be provided between the conductive components and the piezoresistive components, where desired. A set of terminals, represented schematically at 30 and 32, are connected through the outer coaxial conductive component 58 by connecting leads 33 and 34 and jumper leads 28 to the coil 12 for providing the electrical signal thereto. The upper piezoresistive component 54 is electrically connected to a set of terminals 37 and 38 by connecting leads 35 and 36. Terminal 37 is connected to the upper portion of the upper piezoresistive component 54; while the terminal 38 connects to the inner coaxial conductive component 56 which, in turn, connects to the lower portion of the upper piezoresistive component 54. Similarly, terminals 38 and 39 connect to the lower piezoresistive component 55 through connecting leads 40 and 41. In assembling the vibratory assembly, the suspension filaments 48 and 50 are prestressed by rotating each end thereof in an opposite direction. In this manner, a deflection of the galvanometer coil 12 causes one piezoresistive component 54 to decrease its resistance while the resistance of the other component 55 increases. When the piezoresistive components are connected into a bridge circuit, deflection in one direction will cause a positive output from the bridge while a reversed deflection will produce a negative bridge output.

Referring now to FIG. 6, an input signal at input terminals 76 and 77 is introduced to the input of an amplifier 78 whose output is connected to the terminals 30 and 32 of the galvanometer coil 12. A bridge circuit is series connected with the input terminals 76 and 77, and the amplifier 78 for providing a degenerative feedback to the galvanometer coil. The character of the degenerative feedback may be varied to match and compensate for the nonlinear geometrical errors inherent within the galvanometer assembly. The construction of the piezoresistive components 54 and 55 may be arranged in order that their resistive 54 and 55 may be arranged in order that their resistive change is a non-linear function of their deflection, or the output of the amplifier may be characterized for providing a non-linear output signal, or both. The piezoresistive components 54 and 55 are connected into the bridge circuit for forming adjacent arms thereof. A second set of adjacent bridge arms is formed by resistors 79 and 80 and a null or balance resistor 81. One terminal of the slidewire of the sdjustable resistor 81 is connected through resistor 79 to terminal 37 which in turn connects through the upper piezoresistive component 54 to terminal 38. Terminal 38 represents the common connection between the upper and lower piezoresistive components 54 and 55. The lower piezoresistive component 55 connects from terminal 38 to terminal 39 which in turn connects through resistor 80 to the second terminal of the slidewire of resistor 81. A battery 84 is connected between terminals 37 and 39 for supplying the negative feedback potential to the amplifier 78. A wiper arm of the adjustable resistor 81 connects to the input signal terminal 77 while the terminal 38 is connected to a terminal 85 on the input side of the amplifier 78 for completing the negative feedback circuit.

In describing the operation of the novel vibratory assembly of the present invention, it shall be assumed that during assembly the upper piezoresistive component 54 was rotated in a counterclockwise direction, when viewed from the top of the vibratory assembly. The lower piezoresistive component 55 was therefore rotated in a clockwise direction, as described above. The winding of the coil 12, shown schematically in FIG. 6, is also assumed to be arranged for producing a counterclockwise rotation when a positive signal is applied to terminal 30 through the amplifier 78. In operation, therefore, a positive input signal at terminal 76 is applied through amplifier terminal 82 to the amplifier 78 and then to the coil terminal 30 for causing a counterclockwise deflection of the coil 12 that decreases the stress within the upper piezoresistive component 54 and increases the stress within the lower component 55. The resistance of the component 55 increases, as the stress therein increases; while the resistance of component 54 decreases, due to the decreasing stress therein which tends to unwind the prestressed upper piezoresistive component 54. The decrease of component resistance 54 and increase of component resistance 55 unbalances the bridge circuit thereby allowing a positive signal from the battery 84 to be applied to the terminal 85 of the amplifier 78 for reducing the positive potential of the input signal applied to the amplifier input terminal 82. The effect of the positive signal applied to the amplifier terminal 85 produces a degenerative feedback signal for reducing the displacement of the galvanometer coil 12. When the input signal applied to the amplifier is negative the coil deflects in a clockwise direction for unbalancing the bridge and applying a negative signal to the amplifier input terminal 85. The arrangement just described provides a degenerative feedback arrangement for damping the deflection of the galvanometer coil and improving the accuracy and frequency response thereof over a wider frequency range.

Referring to FIG. 4 a second modification of the present invention is shown. Here a galvanometer coil 12 is supported by upper and lower suspension ribbons 88 and 90. A galvanometer mirror 24 is attached to the upper suspension ribbon 88, as by bonding, and provides the standard means for producing an output signal therefrom. A pair of diezoresistive components 92 are deposited on opposite surfaces of the upper suspension ribbon 88 for forming a strain gage thereon. A jumper lead 94 interconnects the lower end of each piezoresistive component 92 while connecting leads 35 and 36 connect the upper end thereof to output terminals 37 and 38. In a like manner, the lower suspension ribbon 90 has a pair of piezoresistive components 92, deposited on opposite surfaces for forming a similar strain gage arrangement thereon. Terminals 38 and 39 are connected to each piezoresistive component 92 by connecting leads 40 and 41 for providing an input thereto, while the upper portions thereof are jumpered by a second jumper lead 94. The jumper leads 94 could be deposited on the surface of the suspension ribbons 88 and 90 for reducing undesirable weight and volume. If this arrangement were utilized, it would be necessary to deposit an insulating layer between the suspension ribbon 88 and 90 and the jumper lead 94. The upper and lower suspension ribbons 88 and 90 are connected to the coil 12 by jumper leads 28 and connected to output terminals 30 and 32 by connecting leads 33 and 34 for completing the electrical circuit to the coil 12. The frame member 23 provides the necessary support for the suspension ribbons 88 and 90 in an arrangement similar to that shown in FIGS. 1 and 2; wherein a collar 96 attaches to the end of each ribbon component, as by bonding, and is pinned to the frame member 23 by pins 98. As seen in FIG. 5, the piezoresistive components 92 are off centered from each other on opposite surfaces of each suspension ribbon thereby providing dynamic balance of the suspension ribbon during motion of the vibratory assembly.

Figure 7:
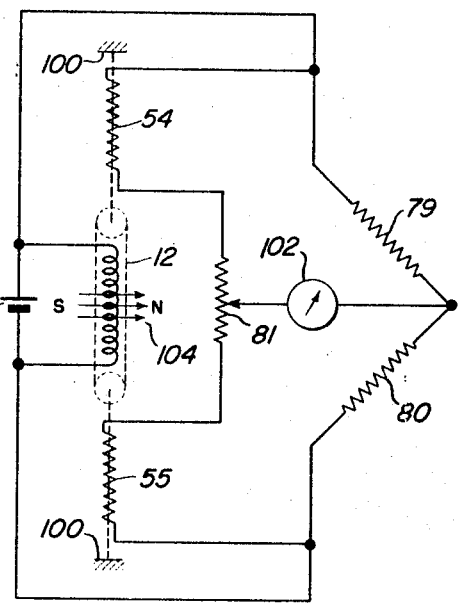
FIG. 7 is a wiring diagram of a galvanometer circuit utilizing the present invention within a flux meter.

FIG. 7 illustrates an embodiment of the present invention in a flux meter arrangement. Here the galvanometer vibratory assembly is shown schematically having a coil 12 supported by upper and lower suspension filaments 54 and 55 which are constructed of piezoresistive material and form adjacent arms of a bridge arrangement. The suspension filaments are suspended from a suitable frame shown schematically at 100. Resistors 79 and 80 form adjacent arms of the bridge and are connected with the piezoresistive components 54 and 55 for completing the bridge loop. An adjustable resistor 81 is provided between the piezoresistive components for initial balance of the bridge circuit. A battery 84 supplies the potential to the bridge circuit wherein the positive terminal thereof connects between the piezoresistive component 54 and resistor 79, while the negative terminal connects between the piezoresistive component 55 and resistor 80. The battery 84 may also be used to supply a fixed potential to the coil 12. A meter 102, for measuring the unbalance within the bridge, is connected to the slide arm of the adjustable resistor 81 between the piezoresistive components 54 and 55 and the junction between resistors 79 and 80. Upon introducing the coil 12 into an unknown magnetic flux, represented by arrows 104, the coil 12 ts deflected in proportion to the strength thereof for causing the piezoresistive components 54 and 55 to assume a new stressed position. The newly assumed position thereby produces a new resistance for unbalancing the bridge circuit. This unbalance is reflected by a change in the meter reading 102 which may be calibrated for directly indicating the intensity of the unknown magnetic flux 104. Such an arrangement would be advantageous where a remote reading of the flux intensity is desirable.

Figure 8:
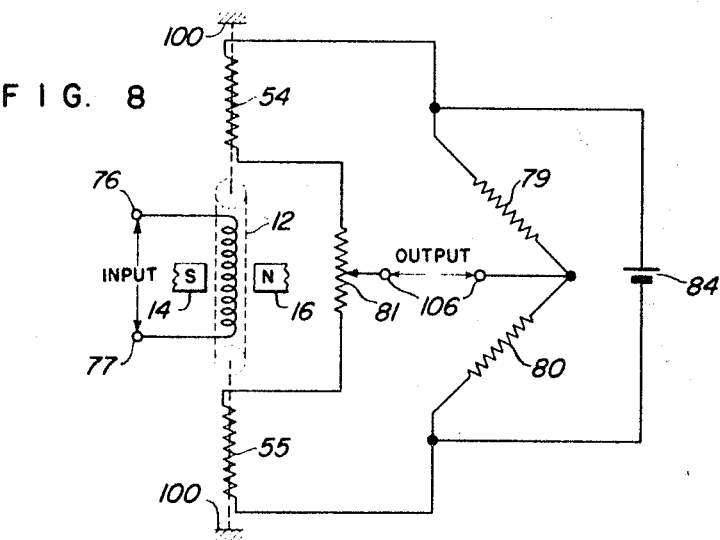
FIG. 8 is a wiring diagram of a galvanometer circuit utilizing the present invention within an amplifier.

The present invention, as described herein, may also be utilized to provide an isolation amplifier. This device is illustrated in FIG. 8 wherein the galvanometer coil 12 is shown suspended by piezoresistive components 54 and 55 connected to a suitable frame 100. The piezoresistive suspension filaments 54 and 55 form adjacent arms of a bridge circuit having fixed resistors 79 and 80 providing the second set of adjacent arms. An adjustable resistor 81 is connected between the piezoresistive components 54 and 55 for initially balancing the bridge. A battery 84, having its positive terminal connected between fixed resistor 79 and piezoresistive component 54 and its negative terminal connected between resistor 80 and piezoresistive component 55, supplies the bridge circuitry with its necessary potential. In operation, an input signal at input terminals 76 and 77 causes the deflection of the galvanometer coil 12 within the magnetic field, established by permanent magnets 14 and 16, thereby producing a stress within the piezoresistive components 54 and 55 for varying the bridge balance. This induced unbalance is used to vary the potential across a pair of output terminals 106 thereby providing an amplified output signal which has been isolated from the input signal by the novel arrangement of the galvanometer vibratory assembly.

The use of a piezoresistive material within the vibratory assembly of a galvanometer produces a degenerative feedback signal which continues during deflection of the coil 12 even if that coil is not in motion. This type of damping is analogous to the electromagnetic damping of prior art devices. If the piezoresistive suspensions filaments were replaced by a piezoelectric material, the feedback signal generated thereby would continue only so long as the galvanometer coil 12 were in motion. The piezoelectric arrangement would then become analogous to the fluid damped arrangement of prior art devices. Without departing from the scope of this invention therefore, a piezoelectric component deposited on a suspension filament of a vibratory assembly of a galvanometer may be utilized in place of the piezoresistive components described hereinabove. The modifications and variations which would therefore be necessary to the schematic wiring diagrams shown herein will become obvious to those skilled in the art in light of the above teachings.

Many other modifications and variations of the present invention will become obvious in light of the above teachings, and it should therefore be understood that the embodiments described hereinabove are illustrations rather than limitations. Consequently, the present invention should be limited only by the appended claims.

What is claimed is:

1. A galvanometer having a coil supported within a magnetic field by a pair of suspension filaments attached to a frame member wherein the improvement comprises,
   suspension filaments including first and second component means joined into an integral filament by the depositing of one component on the surface of the other,
   said first component means constructed from a semiconductor material which undergoes a transformation of electrical character when stressed by a deflection of said coil,
   said second component means constructed from a conductive material,
   electrical means in circuit with said coil via said second component means for providing a deflection signal to said coil, and
   circuit means connecting said first component means in circuit with said electrical means to receive said electrical transformation caused by said deflection of said coil for electrically damping said deflection sgnal.

2. A galvanometer as cited in claim 1 wherein said first semiconductor component means furnishes the structural support for each of said suspension filaments and said second conductive component means is deposited on the surface of said first component means for providing said deflection signal to said coil.

3. A galvanometer as cited in claim 1 wherein said first semiconductor component means is deposited on the surface of said second conductive component means and said second component means furnishes the structural support for said suspension filaments.

4. A galvanometer as cited in claim 1 wherein said galvanometer includes a reflective mirror and is specifically adapted for utilization within an oscillographic recorder.

5. A galvanometer as cited in claim 4 wherein said circuit means includes a bridge means and amplifier means series connected to receive said electrical transformation from said first semiconductor component means for producing a nonlinear feedback for damping said coil deflection to compensate for geometrical errors within said galvanometer thereby increasing the accuracy thereof.

6. A galvanometer as cited in claim 1 wherein said first semiconductor component means of said suspension filament is constructed from a piezoresistive semiconductor material having said electrical transformation characterized as a resistive change.

7. A galvanometer as cited in claim 4 wherein said electrical feedback is a degenerative feedback utilized by said circuit means to decrease said deflection signal within said coil thereby damping said coil deflection and improving the accuracy of said deflection relative to said deflection signal.

8. In a galvanometer having a coil supported within a magnetic field by suspension filaments and having electrical means connected in circuit with the coil for applying a deflection signal thereto, the improvement comprising: at least one of said suspension filaments having strain sensitive means with a variable electrical characteristic responsive to deflection of said coil, said strain sensitive means formed as an integral part of said suspension filament, and circuit means connecting said strain sensitive means in circuit with said electrical means so that the electrical characteristic variations electrically damp the coil deflection by modifying said deflection signal.

References Cited

UNITED STATES PATENTS

| 2,617,842 | 11/1952 | Fink | 324—99 |
| 3,352,150 | 11/1967 | Fouretier | 324—99 X |

FOREIGN PATENTS

| 758,672 | 10/1956 | Great Britain. |
| 794,905 | 5/1958 | Great Britain. |

RUDOLPH V. ROLINEC, Primary Examiner

JERALD J. DEVITT, Assistant Examiner

U.S. Cl. X.R.

324—97, 109